Figure 1:
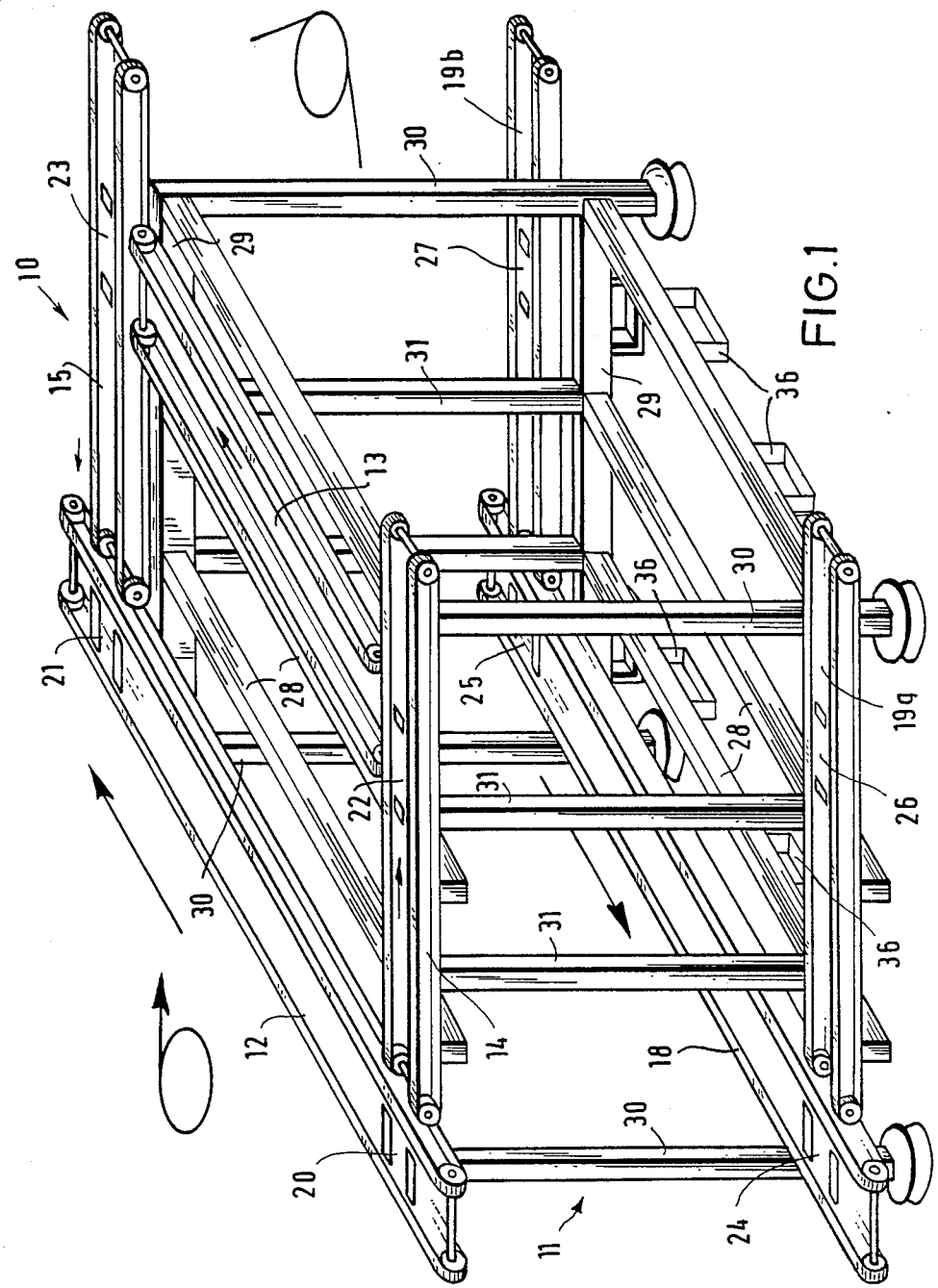

United States Patent [19]

Blöcker

[11] Patent Number: 4,934,507
[45] Date of Patent: Jun. 19, 1990

[54] ASSEMBLY DEVICE AS A BASIC MACHINE FOR ASSEMBLY INSTALLATIONS

[75] Inventor: Detlef Blöcker, Königswinter, Fed. Rep. of Germany

[73] Assignee: Protech Automation GmbH, Fed. Rep. of Germany

[21] Appl. No.: 404,051

[22] Filed: Sep. 7, 1989

Related U.S. Application Data

[63] Continuation of Ser. No. 237,799, Aug. 29, 1988, abandoned.

[51] Int. Cl.$^5$ .............................................. B65G 47/30
[52] U.S. Cl. .............................. 198/346.2; 198/465.3; 198/346.1; 198/580
[58] Field of Search ............... 198/465.2, 465.3, 580, 198/346.2, 346.1, 860.2, 362, 363, 583

[56] References Cited

U.S. PATENT DOCUMENTS

| 853,365 | 5/1907 | Klein | 198/465.3 |
|---|---|---|---|
| 1,425,556 | 8/1922 | Tinswall et al. | 198/363 |
| 1,905,025 | 4/1933 | Allen | 198/580 X |
| 4,485,911 | 12/1984 | Cameron | 198/465.2 X |
| 4,515,264 | 5/1985 | Sticht | 198/465.2 X |
| 4,722,653 | 2/1988 | Williams et al. | 198/346.1 X |
| 4,787,496 | 11/1988 | Prodel et al. | 198/583 X |

FOREIGN PATENT DOCUMENTS

| 0472088 | 2/1929 | Fed. Rep. of Germany | 198/580 |
|---|---|---|---|
| 1456954 | 2/1969 | Fed. Rep. of Germany | 198/580 |
| 3514716 | 10/1986 | Fed. Rep. of Germany | . |
| 0022663 | 2/1983 | Japan | 198/346.1 |

Primary Examiner—Joseph E. Valenza
Assistant Examiner—James R. Bidwell
Attorney, Agent, or Firm—Diller, Ramik & Wight

[57] ABSTRACT

An assembly device forming a basic machine for an assembly line which includes a plurality of conveyors; the plurality of conveyors including a first main conveyor (12), a secondary conveyor (13) extending in parallel relationship to the main conveyor (12) and two relatively spaced parallel lateral conveyors (14, 15) connecting ends of the secondary conveyor (13) to the main conveyor (12), the plurality of conveyors being disposed in a working plane, a second main conveyor (18) arranged in a return travel plane substantially coincident with the first main conveyor (12), two relatively spaced parallel lateral conveyors (19a, 19b) disposed in the return travel plane which are substantially coincident with the first-mentioned two lateral conveyors (14, 15) of the working plane, and transfer stations (20-27) at the points at which the plurality of conveyors meet at right angles.

17 Claims, 5 Drawing Sheets

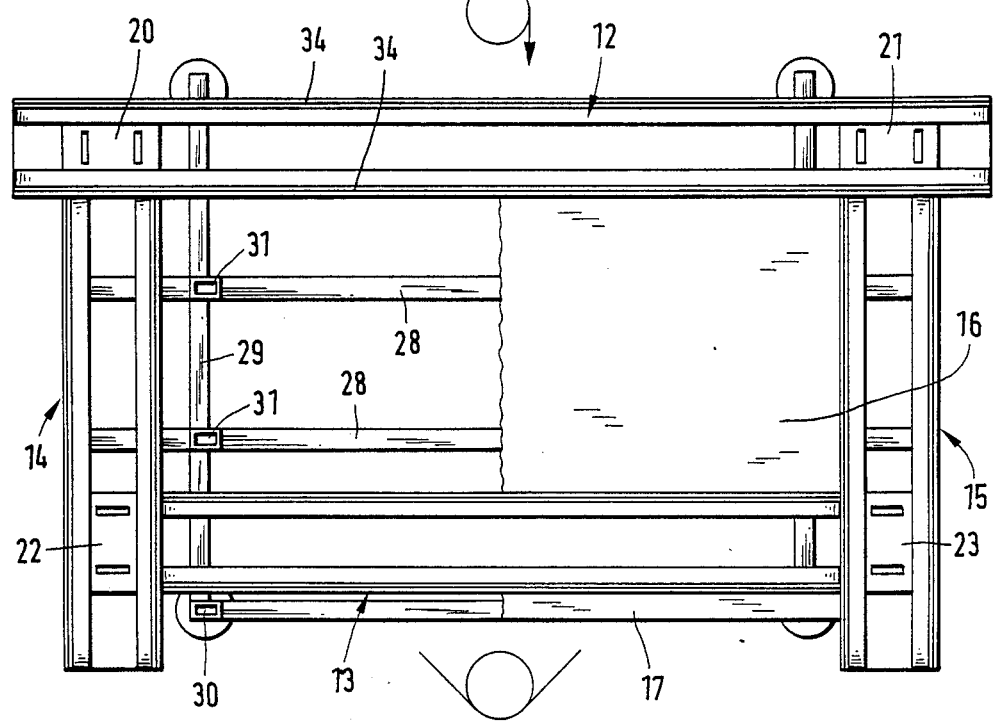

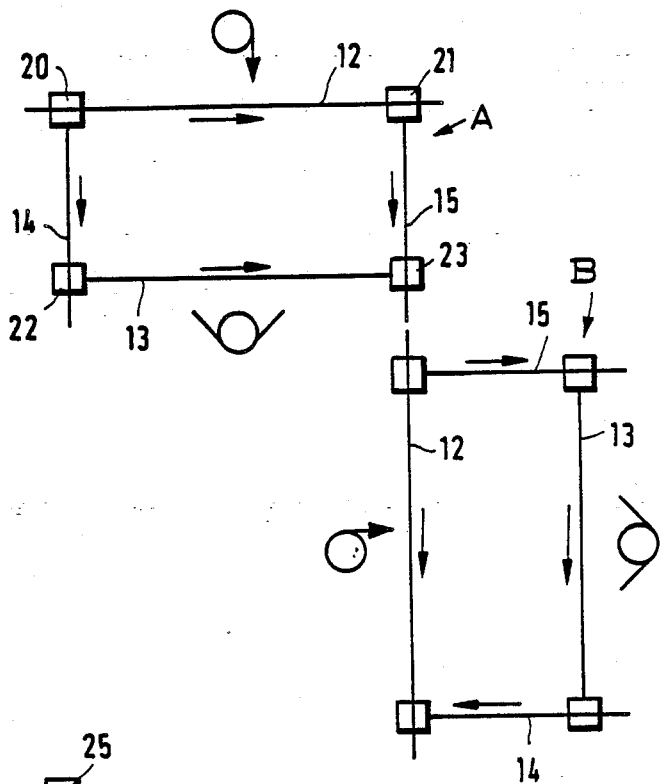
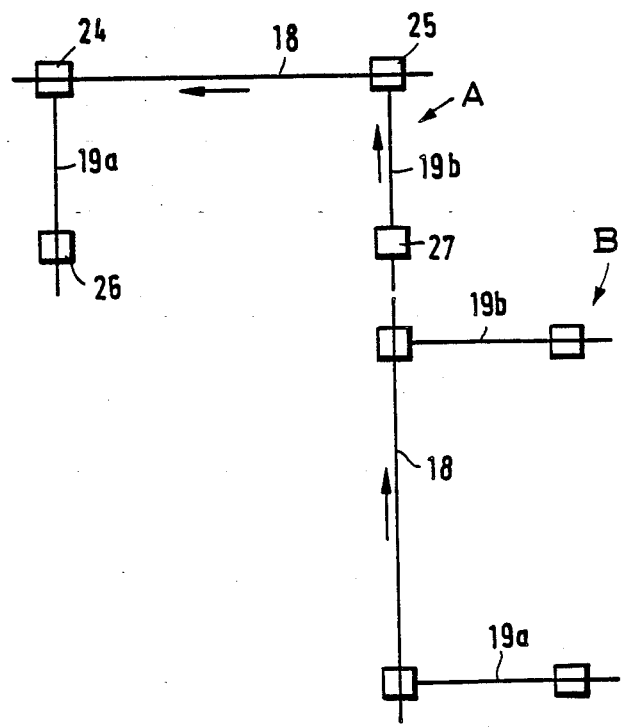
FIG.5a
FIG.5b

ASSEMBLY DEVICE AS A BASIC MACHINE FOR ASSEMBLY INSTALLATIONS

This application is a continuation of application Ser. No. 07/237,799, filed Aug. 19, 1988 and now abandoned.

The invention relates to an assembly device as a basic machine for assembly lines.

Such assembly devices comprise a support including a plurality of conveyers. Several assembly devices may be set against each other to form an assembly line. In an upper working plane, workpieces are conveyed which in each basic machine, are optionally conducted to a secondary conveyer and branched off the main conveying line accordingly. On the secondary conveyer on which pallets or workpieces may be arrested, assembly operations may be achieved. The return of the workpieces is performed in the lower recycling plane in which each assembly device comprises a conveyer.

According to a known assembly device (German Patent Application 35 14 716), the working plane comprises a main conveyer, a secondary conveyer extending in parallel thereto, and two lateral conveyers. All of the three conveyers are basically of the duplex conveyer type comprising two parallel conveyer belts onto which the pallets carrying the workpieces may be placed. At sites at which adjacent conveyers meet at right angles, there are transfer stations which comprise a corresponding turning means for turning the pallets into the changing conveying direction. Said transfer stations are separate units which are disposed in the rectangle formed between two adjacent conveyers. Said conveyers do not directly meet accordingly, but each of them abuts against the transfer station. In the return plane, there is a second main conveyer extending in longitudinal direction of the support and lending itself to be arranged in three different positions, viz. either in coincidence with the main conveyer in the working plane or in the central region of the support, or in coincidence with the secondary conveyer of the working plane. In any case, only one return movement is possible lengthwise of the support. If a plurality of basic machines are to be mounted successively in straight alignment, the setup of the assembly line comprising basic machines of the same design is not critical, while difficulties arise if the basic machines are arranged in angular order or such as to be laterally offset. In such a case, the individual basic machines have to be modified in accordance with their setup in order to provide an assembly line with to- and back-transport, but without the use of additional conveying paths.

It is the object of the invention to provide an assembly device of the type in which a plurality of basic machines of the same construction may be composed to form various combinations without the need of adapting the individual basic machines to the corresponding space conditions.

In case of the assembly device of the instant invention, the return travel plane of each basic machine comprises, in addition to the main conveyer, two lateral conveyers which are mounted beneath the lateral conveyers of the working plane. If two basic machines are series-connected so that, by their conveyers situated in the working plane, the workpieces are passed from one basic machine to another, the conveyers disposed in the return travel plane are simultaneously oriented in accordance with the conveyers of the working plane thus ensuring that, upon their return travel, the workpieces are moved on a way passed already during the forward travel, but being now in a different vertical plane. Therefore, no additional measures need be taken for the return transport.

Each kind of space combination of basic machines by which a forward conveying path is created, simultaneously brings about a complete return transport line without additional operations. Not all of the conveyers of the return travel plane of a basic support are always utilized, but only those conveyers which are actually required for the return travel path. Said conveyers are driven in the sense required for the return at the corresponding place of use. Therefore, the drives of the conveyers should be reversible. In case of a fixed installation, the drive is only in one sense. The conveying direction of each conveyer of the return travel plane is opposite to the conveying direction of the overlying conveyer of the working plane.

It is not necessary to use in the return plane a conveyer which corresponds to the overlying conveyer in the working plane, but a secondary conveyer in the return plane may be even omitted because no bypass performance is required there while four conveyers are required in the working plane, three may be sufficient in the return plane of which, as a rule, at most two are used only for the return movement, while the third remains unused.

Another object of the invention is the improved possibilities of transfer from one basic machine to the other; the possible variations are multiplied. Above all, the arrangement of several basic machines in various angular combinations is facilitated.

In further accordance with the invention, the transfer stations are simplified because only one short transfer conveyer is required which is located within the range of the main conveyer or of the lateral conveyer and which conveys in transverse direction to said main or lateral conveyers and is driven by its lower belt half. The known transfer stations always need two transfer conveyers arranged crosswise.

Figure 2:
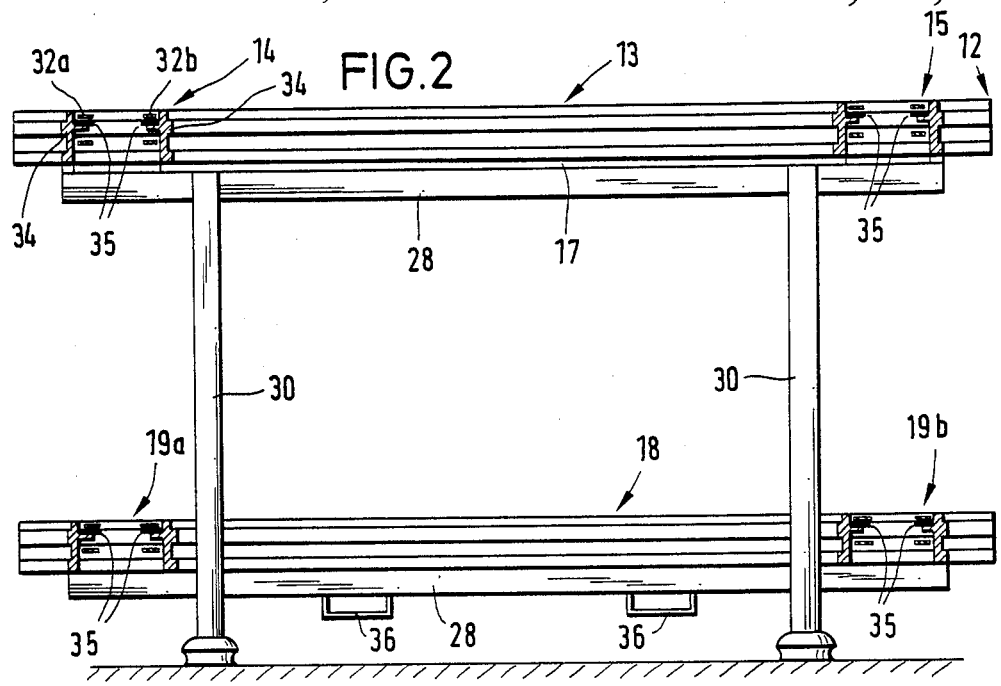
Figure 3:
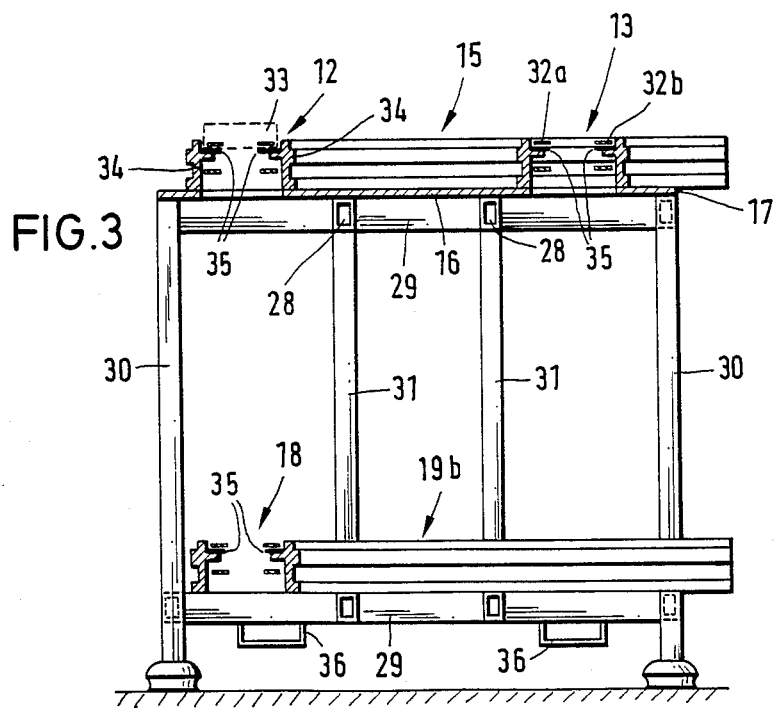
Figure 6:
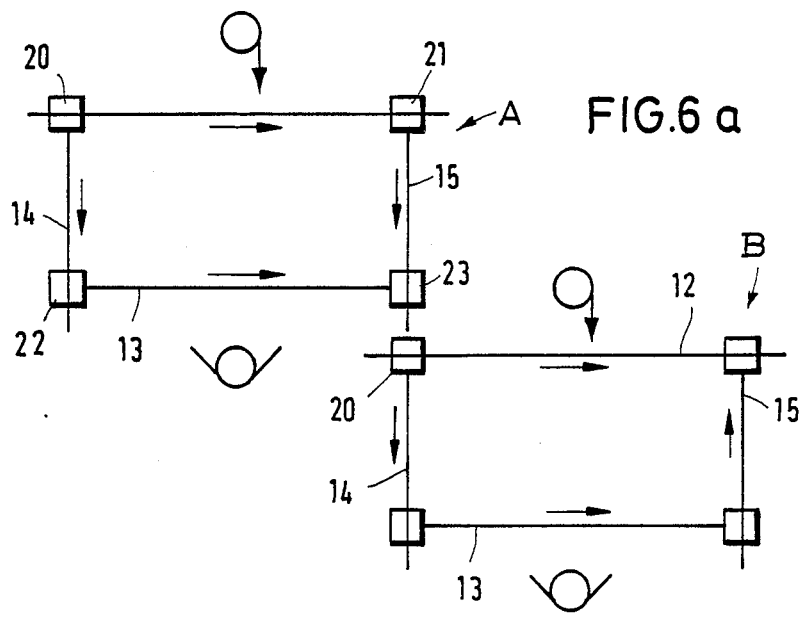
Figure 6:
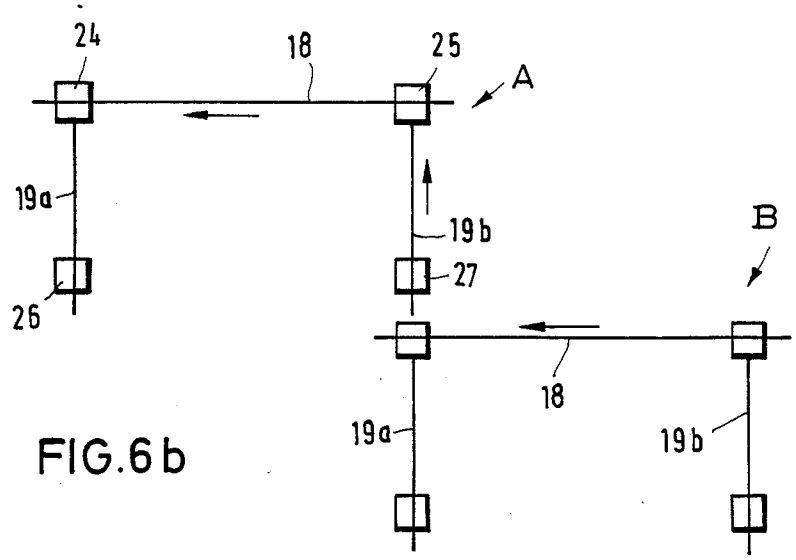

An embodiment of the invention is explained in more detail with reference to the drawings in which FIG. 1 is a schematic exploded view of the basic machine, FIG. 2 is a side view of the basic machine, FIG. 3 is an end view, FIG. 4 is a plan view, FIG. 5 and FIG. 5b are is a schematic illustration of the conveyers of two combined basic machines in the working plane and in the return travel plane, FIG. 6a and FIG. 6b are is another embodiment of the combination of the conveyers of two basic machines in the working plane and in the return travel plane.

The basic machine 10 shown in FIG. 1 comprises a support 11 to which several conveyers are secured which are of the duplex conveyer type. Each conveyer comprises two parallel conveyer belts which travel at a mutual spaced relationship and which are driven synchronously. Articles or pallets may be placed on both conveyer belts simultaneously, the central areas of the articles or pallets being arranged unsupportedly above the interspace of the conveyer belts.

The basic machine contains an upper working plane and a lower return travel plane. In the working plane, the main conveyer 12 extends in longitudinal direction of the support 11 while the secondary conveyer 13 extends in parallel to the main conveyer 12, said secondary conveyer 13 being shorter than the main conveyer and each of its ends abutting against a lateral conveyer 14 or 15. Said lateral conveyers meet at right angles with the main conveyer 12, whose ends, however, extend beyond the lateral conveyers 14, 15 while the ends of the latter which are averted from the main conveyer 12 extend beyond the lateral conveyers. All of the conveyers 12,13,14,15 are of a similar design and of the duplex type. The rectangle enclosed by the four conveyers may be filled out by a table plate or a plate of deposit 16 (FIG. 4), while another working or depositing surface 17 is provided in the U-shaped area which is enclosed by the ends of the lateral conveyers 14,15 and the secondary conveyer 13. This area is the operating side indicated by the man-symbol (circle with two tangents). The opposite side, viz. the outer longitudinal side of the main conveyer 12, is the material feed side characterized by a respective symbol (circle with tangential arrow).

In the return travel plane of the support, a main conveyer 18 is provided vertically below the main conveyer 12, i.e. coincident therewith, while beneath each lateral conveyer 14 and 15, a lateral conveyer 19a or 19b is mounted. The dimensions and extents of the conveyers in the return travel plane are equal to those of the corresponding overlying conveyers of the working plane. Beneath the secondary conveyer 13, no conveyer is provided in the return travel plane.

In the course of the main conveyer 12, transfer stations 20 or 21 are provided at the points which are adjacent to a lateral conveyer 14 or 15, said transfer stations consisting of a short duplex conveyer provided transversely between the conveyer belts of the main conveyer 12 and being aligned with the appertaining lateral conveyer 14 or 15. The main conveyer 12 extends beyond the transfer stations 20 and 21 so that its end project freely from the support. Similar transfer stations 22 or 23 are provided in the course of each lateral conveyer 14 or 15, the short conveying paths of the transfer stations 22 and 23 being aligned in longitudinal direction relative to the secondary conveyer 13 and being in flush therewith. The secondary conveyer 13 abuts at right angles against the lateral conveyers 14 and 15 to end there, while the two lateral conveyers 14 and 15 extend beyond the secondary conveyer and their ends project laterally from the support 11.

Further transfer stations 24 and 25 are provided at the lower main conveyer 18 exactly beneath the transfer stations 20 and 21, and other transfer stations 26 and 27 are located at the lateral conveyers 19a and 19b and exactly beneath the transfer stations 22 and 23.

Objects or pallets transported by the main conveyer 12 in the direction indicated by the arrow of FIG.1 may be deviated by the transfer station 20 to the lateral conveyer 14. If another deviation is realised to the secondary conveyer 13, the lateral conveyer 14 and back to the main conveyer 12, a bypass path relative to the main conveyer is formed. By this means, individual pallets may be ordered off the main conveyer to be guided to the secondary conveyer 13 on which pallets or workpieces may be arrested for a processing of the workpieces carried by the pallets.

The transfer conveyers provided in the transfer stations of the return travel plane are alinged in the same way as the transfer conveyers mounted in the respective overlying transfer stations.

The support 11 comprises horizontal longitudinal struts 28 and horizontal transverse struts 29 which are arranged internally of the lateral conveyers 14, 15 or 19,20, while the longitudinal struts 28 intersecting said transverse struts extend beyond the transverse struts in order to back up the laterl conveyers from below. In addition, the support comprises vertical struts 30 erected on the ground by feet adjustable in height, and further vertical struts 31 extending between the horizontal transverse struts 29. At the lower horizontal longitudinal and transverse struts 28 and 29, there are U-shaped holding pockets 36 adapted to engage forks of industrial trucks serving for the transport of the basic machines.

Each of the disclosed conveyers comprises two conveyer belts 32a,32b (FIGS. 2 and 3) which extend at a mutual distance at the same height and onto which a pallet 33 may be placed. The two conveyer belts 32a, 32b move around driving and guide rolls. Each conveyer belt slidingly rests on a plastic bar 35 which is connected to the leg of a profile bar 34 firmly assembled to the support 11. The legs of the two profile bars which belong to a conveyer are confronted with each other. The returning halves of the conveyer belts 32a,32b are beneath the profile legs. The upright profiles 34 are fixed on plates 16 and 17.

In FIG. 1, one embodiment concerning the operation of the conveyers is shown by the drafted arrows indicating the travel direction. While the main conveyer 12 in the working plane is moving continuously or intermittently, individual pallets may be branched off the main conveyer via the lateral conveyers 14 to be supplied to the secondary conveyer 13 where they may be arrested. The layout of the pallets being square, they need not be swivelled by 90° in case of a rectangular branch off the transport path, but on their further travel, their side edge may now become the front edge. Via the lateral conveyer 15, the branched off pallets are returned to the main conveyer 12 beneath which the main conveyer 18 of the return travel plane moves in counterdirection to the upper main conveyer 12.

FIGS. 5a and 5b show an embodiment of two basic machines A and B arranged rectangularly with respect to each other, the conveyers and transfer stations being drafted in short lines or boxes. FIG. 5a shows the course of the the conveyers in the working plane while FIG. 5b shows their course in the return travel plane. The driving sense is indicated by arrows.

The main conveyer 12 of the basic machine B is straightly joined to the lateral conveyer 15 of the basic machine A. By the transfer station 21, all pallets arriving on the main conveyer 12 of the basic machine A are passed on to the lateral conveyer 15. Due to the transfer station 23, pallets arriving from the lateral conveyer 15 and from the secondary conveyer 13 are passed on to the basic machine B where they are either conveyed to the main conveyer 12 or branched off into the lateral conveyer 15 and to the secondary conveyer 13.

As evident from FIG. 5b, in the return travel plane of basic machine A, use is made only of lateral conveyer 19b and of main conveyer 18, and, in case of machine B, only the main conveyer 18 is used. Pallets reset manually or by specific, non-illustrated means, from the working plane to the return travel plane move back there beneath the main flow of the forward moving pallets.

FIGS. 6a and FIG. 6b show an embodiment in which the transfer station 20 of the basic machine B is applied to the projecting portion of the lateral conveyer 15 of basic machine A so that the lateral conveyer 14 of B forms the prolongation of the lateral conveyer 15 of A. As a result, pallets are conveyed from lateral conveyer 15 of A to the transfer station 20 of B to get from there either to the main conveyer 12 or to the lateral conveyer 14 of B.

In the return travel plane shown in FIG. 6b, only the lateral conveyer 19b of A and the main conveyer 18 of B are operated. In said return travel plane, the pallets are moved exactly beneath the main flow in the working plane.

It is obvious that all of the conveyers except for the secondary conveyer 13 are adapted to transfer pallets to another basic machine or to take over such pallets from another basic machine. A transfer or take-over may also take place at each transfer station, namely from the side from which no conveyer of the same basic machine extends to the transfer station. By establishing the transport path in the working plane, a return transport path is established simultaneously in the return travel plane. No constructional changes of the basic machine have to be carried out. It is only necessary to correctly drive the conveyers and the transfer stations.

What is claimed is:

1. An assembly device forming a basic machine for an assembly line comprising a support (11) carrying a plurality of conveyers; said plurality of conveyers including a first main conveyer (12), a secondary conveyer (13) extending in parallel relationship to said first main conveyer (12) and two relatively spaced parallel first lateral conveyers (14, 15) connecting ends of the secondary conveyer (13) to the first main conveyer (12), said plurality of conveyers being disposed in a working travel plane, first means (20, 21) generally at each juncture of each of said first lateral conveyers and said first main conveyer and second means (22, 23) generally at each juncture of each of said first lateral conveyers (14, 15) and said secondary conveyer (13), the first and second means (20, 21; 22, 23) for selectively transferring objects between said first main, secondary and first lateral conveyers, a second main conveyer (18) arranged in a return travel plane substantially coincident with and below said first main conveyer (12), two relatively spaced parallel second lateral conveyers (19a, 19b) disposed in the return travel plane which are substantially coincident with and below said first lateral conveyers (14, 15) of said working travel plane, third means (24, 25) generally below each of said first object transferring means (20, 21) for selectively transferring objects between said second main and second lateral conveyers or selectively to a second main conveyer of an adjacent similarly constructed assembly device, and fourth means (26, 27) generally below each of said second object transferring means (22, 23) for selectively transferring objects between said second lateral conveyers (19i a, 19b) and an adjacent similarly constructed assembly device.

2. The assembly device as defined in claim 1 wherein said first main conveyer (12) has longitudinally opposite ends, and said first main conveyer longitudinally opposite ends each extends longitudinally beyond an adjacent one of said two first lateral conveyers (14, 15).

3. The assembly device as defined in claim 1 wherein said second main conveyer (18) has longitudinally opposite ends, and said second main conveyer longitudinally opposite ends each extends longitudinally beyond an adjacent one of said two second lateral conveyers (19a, 19b).

4. The assembly device as defined in claim 1 wherein said first main conveyer (12) has longitudinally opposite ends, and said first main conveyer longitudinally opposite ends each extends longitudinally beyond an adjacent one of said two first lateral conveyers (14, 15), said second main conveyer (18) has longitudinally opposite ends, and said second main conveyer longitudinally opposite ends each extends longitudinally beyond an adjacent one of said two second lateral conveyers (19a, 19b).

5. The assembly device as defined in claim 1 wherein said first lateral conveyers (14, 15) each has longitudinally opposite ends, and said second object transferring means (22, 23) are located between the opposite ends of an associated one of each of said first lateral conveyers (14, 15).

6. The assembly device as defined in claim 1 wherein said second lateral conveyers (19i a, 19b) each has longitudinally opposite ends, and said fourth object transferring means (26, 27) are located between opposite ends of an associated one of each of said second lateral conveyers (19i a, 19b).

7. The assembly device as defined in claim 1 wherein said first lateral conveyers (14, 15) each has longitudinally opposite ends, and said second object transferring means (22, 23) are located between the opposite ends of an associated one of each of said first lateral conveyers (14, 15), said second lateral conveyers (19a, 19b) each has longitudinally opposite ends, and said fourth object transferring means (26, 27) are located between opposite ends of an associated one of each of said second lateral conveyers (19a, 19b).

8. The assembly device as defined in claim 2 wherein said first lateral conveyers (14, 15) each has longitudinally opposite ends, and said second object transferring means (22, 23) are located between the opposite ends of an associated one of each of said first lateral conveyers (14, 15).

9. The assembly device as defined in claim 2 wherein said second lateral conveyers (19a, 19b) each has longitudinally opposite ends, and said fourth object transferring means (26, 27) are located between opposite ends of an associated one of each of said second lateral conveyers (19a, 19b).

10. The assembly device as defined in claim 2 wherein said first lateral conveyers (14, 15) each has longitudinally opposite ends, and said second object transferring means (22, 23) are located between the opposite ends of an associated one of each of said first lateral conveyers (14, 15), said second lateral conveyers (19a, 19b) each has longitudinally opposite ends, and said fourth object transferring means (26, 27) are located between opposite ends of an associated one of each of said second lateral conveyors (19a, 19b).

11. The assembly device as defined in claim 3 wherein said first lateral conveyers (14, 15) each has longitudinally opposite ends, and said second object transferring means (22, 23) are located between the opposite ends of an associated one of each of said first lateral conveyers (14, 15).

12. The assembly device as defined in claim 3 wherein said second lateral conveyers (19a, 19b) each has longitudinally opposite ends, and said fourth object transferring means (26, 27) are located between opposite ends of an associated one of each of said second lateral conveyers (19a, 19b).

13. The assembly device as defined in claim 3 wherein said first lateral conveyer s(14, 15) each has longitudinally opposite ends, and said second object transferring means (22, 23) are located between the opposite ends of an associated one of each of said first lateral conveyers (14, 15), said second lateral conveyers (19a, 19b) each has longitudinally opposite ends, and said fourth object transferring means (26, 27) are located between opposite ends of an associated one of each of said second lateral conveyers (19a, 19b).

14. The assembly device as defined in claim 4 wherein said first lateral conveyers (14, 15) each has longitudinally opposite ends, and said second object transferring means (22, 23) are located between the opposite ends of an associated one of each of said first lateral conveyers (14, 15).

15. The assembly device as defined in claim 4 wherein said second lateral conveyers (19a, 19b) each has longitudinally opposite ends, and said fourth object transferring means (26, 27) are located between opposite ends of an associated one of each of said second lateral conveyers (19a, 19b).

16. The assembly device as defined in claim 4 wherein said first lateral conveyers (14, 15) each as longitudinally opposite ends, and said second object transferring means (22, 23) are located between the opposite ends of an associated one of each of said first lateral conveyers (14, 15), said second lateral conveyers (19a, 19b) each has longitudinally opposite ends, and said fourth object transferring means (26, 27) are located between opposite ends of an associated one of each of said second lateral conveyers (19a, 19b).

17. A pair of assembly devices forming a basic machine for an assembly line comprising first and second supports (11,11), each first and second supports (11, 11) carrying a plurality of conveyers; each said plurality of conveyers including a first main conveyer (12), a secondary conveyer (13) extending in parallel relationship to said first main conveyer (12) and two relatively spaced parallel first lateral conveyers (14, 15) connecting ends of the secondary conveyer (13) to the first main conveyer (12), said plurality of conveyers being disposed in a working travel plane, first means (20, 21) generally at each juncture of each of said first lateral conveyers and said first main conveyer and second means (22, 23) generally at each juncture of each of said first lateral conveyers (14, 15) and said secondary conveyer (13), the first and second means (20. 21; 22, 23) for selectively transferring objects between said first main, secondary and first lateral conveyers, a second main conveyer (18) arranged in a return travel plane substantially coincident with and below said first main conveyer (12), two relatively spaced parallel second lateral conveyers (19a, 19b) disposed in the return travel plane which are substantially coincident with and below said first lateral conveyers (14, 15) of said working travel plane, third means (24, 25) generally below each of said first object transferring means (20, 21) for selectively transferring objects between said second main and second lateral conveyers or selectively to a second main conveyer of an adjacent similarly constructed assembly device, fourth means (26, 27) generally below each of said second object transferring means (22, 23) for selectively transferring objects between said second lateral conveyers (19a, 19b) and an adjacent similarly constructed assembly device, and said first and second supports (11, 11) are constructed and arranged adjacent each other so as to transfer objects between each other by at least one of said first, second, third and fourth objects transferring means (20, 21; 22, 23; 24, 25; 26, 27).

* * * * *